(12) United States Patent
Fierro et al.

(10) Patent No.: US 6,364,073 B1
(45) Date of Patent: Apr. 2, 2002

(54) STEERING KNUCKLE SENSOR ASSEMBLY

(75) Inventors: Pedro Fierro; Juan C Lozano, both of Chihuahua (MX)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/773,097

(22) Filed: Jan. 31, 2001

(51) Int. Cl.[7] .............................. B60T 8/72; B60B 27/00
(52) U.S. Cl. .................................. 188/181 R; 188/18 R; 301/105.1
(58) Field of Search ................... 280/93, 572, 124.135, 280/124.136; 188/17, 18 A, 18 R, 181 R; 73/494; 310/168; 180/259; 301/105.1

(56) References Cited

U.S. PATENT DOCUMENTS

| | | | | |
|---|---|---|---|---|
| 4,161,120 A | * | 7/1979 | Cloarec | .................. 73/494 |
| 4,637,488 A | * | 1/1987 | Fotheringham et al. | . 188/181 R |
| 5,011,302 A | * | 4/1991 | Mott et al. | .................. 310/168 |
| 6,099,003 A | * | 8/2000 | Olszewski et al. | ..... 280/93.512 |
| 6,196,639 B1 | * | 3/2001 | Di Ponio et al. | ........ 301/105.1 |
| 6,244,391 B1 | * | 6/2001 | Bunker | ..................... 188/18 A |

* cited by examiner

Primary Examiner—Christopher P. Schwartz
(74) Attorney, Agent, or Firm—Margaret A. Dobrowitsky

(57) ABSTRACT

A steering knuckle sensor assembly includes a steering knuckle that forms a central bore and a sensor bore that extends radially from the central bore. A target ring that circumscribes a shaft rotates within the central bore. A speed sensor is disposed in the sensor bore so that it senses the angular speed of the target ring. If the speed sensor is damaged or otherwise fails, it can easily be replaced without the need to replace any other parts within the steering knuckle.

13 Claims, 1 Drawing Sheet

US 6,364,073 B1

STEERING KNUCKLE SENSOR ASSEMBLY

TECHNICAL FIELD

The present invention relates generally to sensors and actuators.

BACKGROUND OF THE INVENTION

For safety concerns, many of today's vehicles are equipped with anti-lock brake systems (ABS). An ABS maintains vehicle control during extreme braking by preventing the wheels from locking up and slipping on the road surface. The ABS maintains vehicle control by electronically sensing when the wheels are just about to lock up and releasing the brakes before lock up occurs. An ABS is capable of modulating the pressure in the wheel cylinders in order to keep the wheels just under slip conditions.

Modern ABS electronically sense when the wheels are just about to lock up and release the brakes before lock up occurs. These systems are capable of modulating the pressure in the wheel cylinders in order to keep the wheels just under peak slip conditions. In general, a typical modern anti-lock brake system includes an electronic control unit, a wheel speed sensor located at each wheel, and a solenoid valve for controlling the hydraulic pressure in each wheel cylinder.

One type of speed sensor is a wheel bearing speed sensor in which the sensor is mounted in a wheel bearing that supports a rotating shaft to which the wheel is attached. Unfortunately, if the wheel bearing speed sensor is damaged or fails, not only must the defective speed sensor be replaced, the wheel bearing must also be replaced resulting in considerable extra cost.

The present invention has recognized the above drawbacks, and has provided the below-disclosed solutions to one or more of these deficiencies.

SUMMARY OF THE INVENTION

A steering knuckle sensor assembly includes a steering knuckle that forms a first bore and a second bore that leads to the first bore. A shaft is disposed within the first bore and rotates with respect to the steering knuckle. Moreover, a target ring circumscribes the shaft, and as the shaft rotates, the target ring rotates therewith within the first bore. The steering knuckle sensor assembly also includes a speed sensor that defines a distal end. The speed sensor is disposed within the second bore such that the distal end is slightly distanced from the target ring.

In a preferred embodiment, the second bore extends radially from the first bore. Moreover, the assembly includes a holder that is attached to the steering knuckle and engaged with the speed sensor. Preferably, a sensor wire connects the speed sensor to a control module. The control module receives a signal from the speed sensor that represents the speed of the shaft relative to the steering knuckle. In a preferred embodiment, the assembly includes a clip that is attached to the steering knuckle and engaged with the sensor wire.

In another aspect of the present invention, a vehicle braking system includes a master cylinder, a solenoid valve that communicates with master cylinder, and a wheel cylinder that also communicates with solenoid valve. Additionally, the vehicle braking system includes a control module that is connected to the solenoid valve. This aspect of the present invention also includes a steering knuckle sensor assembly. The steering knuckle sensor assembly includes a speed sensor that is connected to the control module. Accordingly, the speed sensor sends a signal to the control module that represents an angular wheel speed.

The present invention will now be described, by way of example, with reference to the accompanying drawings, in which:

DESCRIPTION OF AN EMBODIMENT OF THE INVENTION

Figure 1:
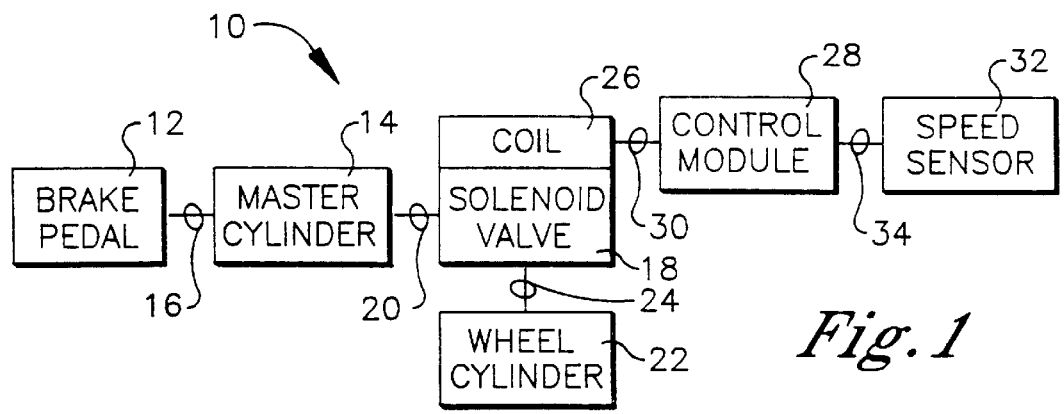
FIG. 1 is a block diagram of a vehicle braking system.

Referring initially to FIG. 1, a vehicle brake system is shown and generally designated 10. As shown in FIG. 1, the brake system includes a brake pedal 12 mechanically connected to a master cylinder 14 by a linkage 16. The master cylinder 14 communicates with a solenoid valve 18 via a first fluid line 20 and, in turn, the solenoid valve 18 communicates with a wheel cylinder 22 via a second fluid line 24. When the solenoid valve 18 is open, the master cylinder 14 communicates with the wheel cylinder 22 through the solenoid valve 18.

As shown in FIG. 1, the solenoid valve 18 includes a coil 26 that is energizable to open or close the solenoid valve. The coil 26 is connected to a control module 28 by a first electrical line 30. Additionally, a speed sensor 32 is connected to the control module 28 by a second electrical line 34.

Under normal braking conditions a driver can depress the brake pedal 12 causing the master cylinder 14 to pump fluid to the wheel cylinder 22 in order to slow the vehicle. Using the speed sensor 32, the control module 28 can monitor wheel speed to determine when a wheel is about to lock up. When the wheel is about to lock up, the control module 28 can send a signal to the coil 26 to energize the solenoid 18 and control the flow of fluid between the master cylinder 14 and the wheel cylinder 22 in order to prevent the wheel from locking up.

Figures 2, 3:
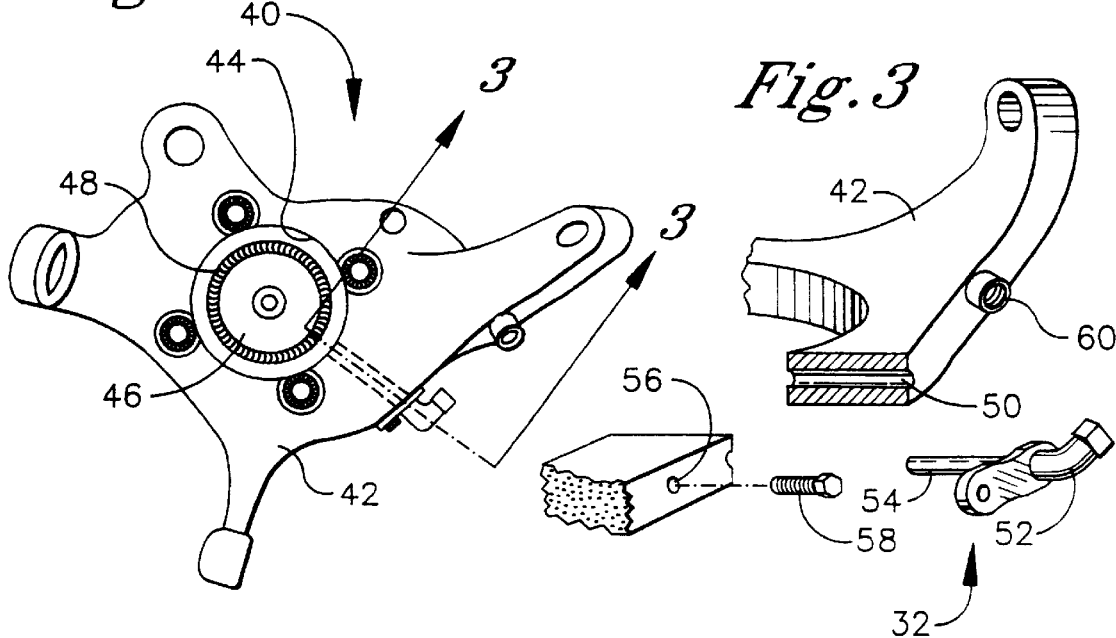
FIG. 2 is plan view of a steering knuckle sensor assembly.
FIG. 3 is a perspective view of a portion of the steering knuckle sensor assembly with the steering knuckle cross-sectioned along line 3—3 in FIG. 2.

Referring to FIG. 2, a steering knuckle sensor assembly is shown and generally designated 40. FIG. 2 shows that the steering knuckle sensor assembly 40 includes a steering knuckle 42 formed with a central bore 44 through which a shaft 46 passes perpendicularly. The shaft 46 supports a wheel (not shown) and the shaft 46 and wheel rotate in unison with respect to the steering knuckle 42. As shown in FIG. 2, a target ring 48 circumscribes the shaft 46

FIG. 3 shows that the steering knuckle 42 is formed with a sensor bore 50 that extends radially from the central bore 44 formed in the steering knuckle 42. FIG. 3 also shows the speed sensor 32 shown and described in relation to FIG. 1. As shown in FIG. 3, the speed sensor 32 defines a proximal end 52 and a distal end 54. As intended by the present invention, the speed sensor 32 is disposed in the sensor bore 50 so that the distal end 54 of the sensor 32 is near the target 48. As the shaft 46 rotates, the speed sensor 32 and target 48 are used to determine the angular velocity of the shaft 46. FIG. 3 shows that the steering knuckle 42 is formed with a threaded bore 56 in which a correspondingly threaded first bolt 58 is inserted to hold the speed sensor 32 in place within the sensor bore 50. FIG. 3 also shows that the steering knuckle 42 is formed with a threaded hub 60 to which the clip, described below, can be attached in order to hold the sensor wire, described below.

Figure 4:
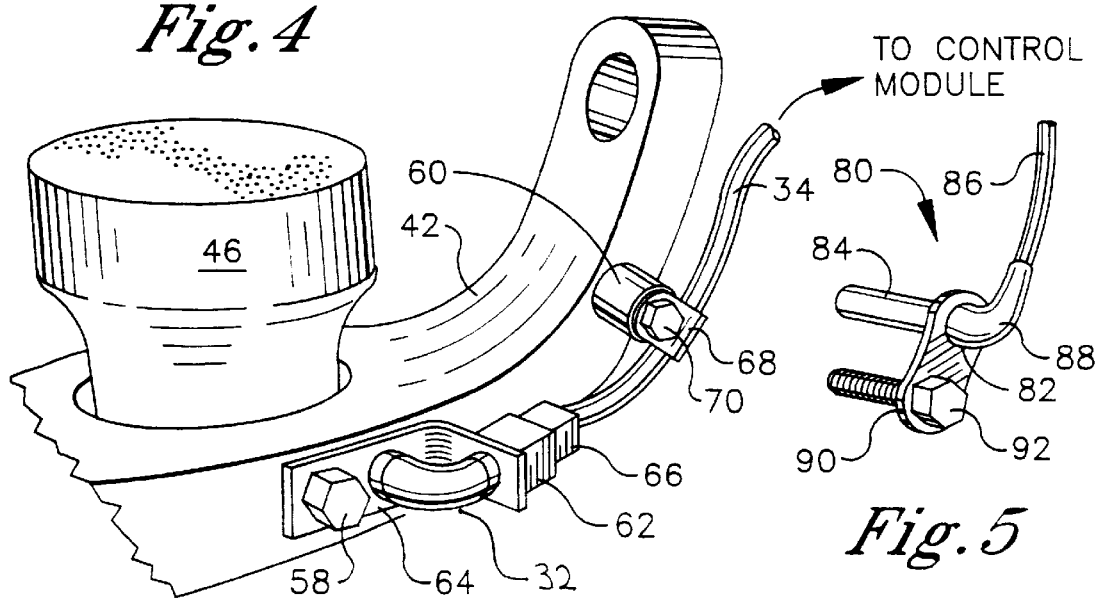
FIG. 4 is a perspective view of a portion the steering knuckle sensor assembly.

Referring now to FIG. 4, the speed sensor 32 is shown installed in the steering knuckle 42. As shown in FIG. 4, the speed sensor 32 includes an integrally formed connector housing 62 and a holder 64, e.g., a bracket, through which the first bolt 58 passes before being threaded into the threaded bore 56. A sensor wire 34, described above in relation to FIG. 1, is connected to the connector housing 62. It is to be appreciate that the sensor wire 34 includes a terminal end 66 that is sized and shaped to fit into the connector housing 62. FIG. 4 also shows a clip 68 that is used to attach the signal wire 34 to the threaded hub 60 using a correspondingly threaded second bolt 70.

Figure 5:
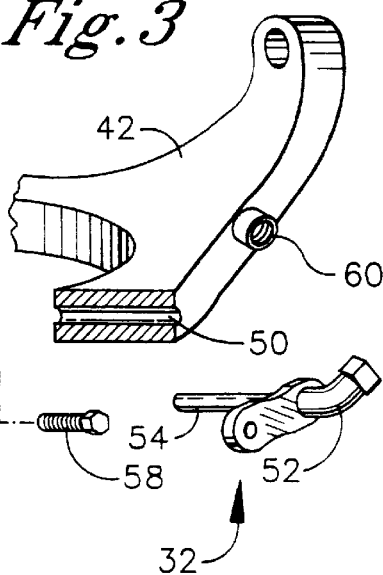
FIG. 5 is a perspective view of an alternative speed sensor.

FIG. 5 shows an alternative embodiment of the speed sensor generally designated 80. This "pig tail" design speed sensor 80 defines a proximal end 82 and a distal end 84. A sensor wire 86 is attached directly to the speed sensor 80 and exits at a right angle to the speed sensor 80 through a preferably rubber shroud 88 attached to the proximal end 82 of the sensor 80. A holder 90, e.g., a bracket, and a bolt 92 are used to hold the pig tail speed sensor 80 within the sensor bore 50 described in relation to FIG. 3.

With the configuration of structure described above, it is to be appreciated that the steering knuckle sensor assembly provides a means by which the wheel speed can be determined in relation to a steering knuckle. If the speed sensor is damaged or otherwise fails, it can be relatively easily replaced without the need to replace any other part within the steering knuckle.

While the particular STEERING KNUCKLE SENSOR ASSEMBLY as herein shown and described in detail is fully capable of attaining the above-described objects of the invention, it is to be understood that it is the presently preferred embodiment of the present invention and thus, is representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it is to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. section 112, sixth paragraph, unless the element is expressly recited using the phrase "means for."

What is claimed is:

1. A steering knuckle sensor assembly comprising:
    a steering knuckle, the steering knuckle forming a first bore, and a second bore leading to the first bore;
    a solid shaft within the first bore, the shaft rotating with respect to the steering knuckle;
    a target ring circumscribing the shaft such that as the shaft rotates the target ring rotates therewith within the first bore; and
    a speed sensor defining a distal end, the speed sensor being disposed within the second bore such that the distal end is slightly distanced from the target ring.

2. The assembly of claim 1, wherein the second bore extends radially from the first bore.

3. The assembly of claim 1, further comprising:
    a holder attached to the steering knuckle and engaged with the speed sensor.

4. The assembly of claim 1, further comprising:
    a sensor wire that connects the speed sensor to a control module, the control module receiving a signal from the speed sensor representing the speed of the shaft relative to the steering knuckle.

5. The assembly of claim 4, further comprising:
    a clip attached to the steering knuckle and engaged with the sensor wire.

6. A vehicle braking system, comprising:
    a master cylinder;
    a solenoid valve communicating with the master cylinder;
    a wheel cylinder communicating with the solenoid valve;
    a control module connected to the solenoid valve; and
    a steering knuckle sensor assembly, the steering knuckle sensor assembly including a speed sensor connected to the control module, the speed sensor sending a signal to the control module representing an angular wheel speed, the steering knuckle sensor assembly including a solid shaft circumscribed by a target ring.

7. The vehicle braking system of claim 6, wherein the solenoid valve includes a coil, the coil being connected to the control module the control module energizing the coil at least partially based on the signal from the speed sensor.

8. The vehicle braking system of claim 6, wherein the steering knuckle sensor assembly further comprises:
    a steering knuckle, the steering knuckle forming a first bore and a second bore leading to the first bore, the shaft being rotatably disposed within the first bore, the target ring rotating within the first bore with the shaft; and
    a speed sensor defining a distal end, the speed sensor being disposed within the second bore such that the distal end is slightly distanced from the target ring.

9. The vehicle braking system of claim 8, wherein the speed sensor defines a distal end, the speed sensor being disposed within the second bore such that the distal end is slightly distanced from the target ring.

10. The vehicle braking system of claim 9, wherein the second bore extends radially from the first bore.

11. The vehicle braking system of claim 10, wherein the steering knuckle sensor assembly further comprises:
    a holder attached to the steering knuckle and engaged with the speed sensor.

12. The vehicle braking system of claim 11, wherein the steering knuckle sensor assembly further comprises:
    a sensor wire that connects the speed sensor to the control module.

13. The vehicle braking system of claim 12, wherein the steering knuckle sensor assembly further comprises:
    a clip attached to the steering knuckle and engaged with the sensor wire.

* * * * *